United States Patent

[11] 3,569,719

[72] Inventor Eugene H. Dryden
San Marino, Calif.
[21] Appl. No. 698,096
[22] Filed Jan. 10, 1968
[45] Patented Mar. 9, 1971
[73] Assignee The United States of America as represented by the Secretary of the Navy

[54] INFRARED TRACKER ERROR SIGNAL GENERATION AND PROCESSING SYSTEM
6 Claims, 5 Drawing Figs.
[52] U.S. Cl.................................................. 250/203,
178/7.6, 250/83.3
[51] Int. Cl..................................................... G01j 1/20
[50] Field of Search........................................ 250/203;
88/1 (M); 178/7.6, 7 (TK)

[56] References Cited
UNITED STATES PATENTS
3,418,478 12/1968 Falbel.......................... 250/203X Primary Examiner—Richard A. Farley
Assistant Examiner—William T. Rifkin
Attorneys—George J. Rubens and H. H. Losche ABSTRACT: An infrared tracker error signal generator having a telescope containing a mirror and a scanning mechanism, the action of the latter producing on the mirror an image of an assumed point target object at infinity, which image is scanned across the surface of a detector element in a pattern prescribed by the input commands to the scanning mechanism to produce detector outputs each time the image crosses the detector, the detector outputs being processed in circuitry to develop horizontal and vertical error signals for the tracker system to bring the center of scan to the center of the detector band in the telescope.

PATENTED MAR 9 1971          3,569,719
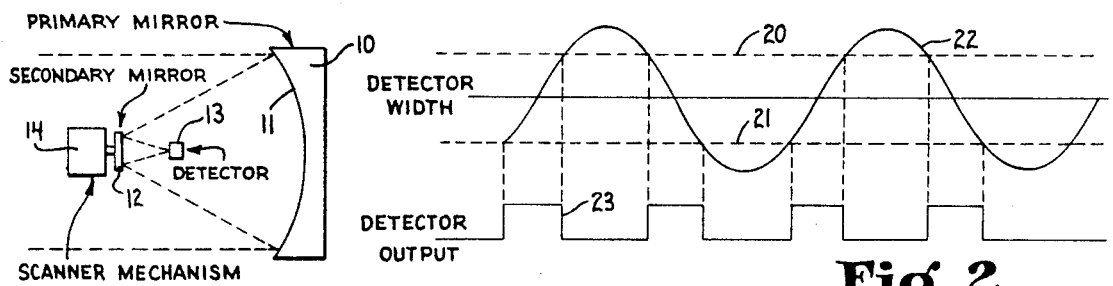
Fig. 1.
Fig. 2.
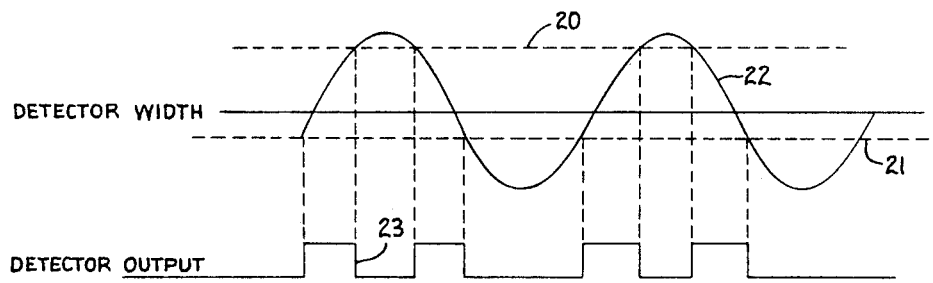
Fig. 3.
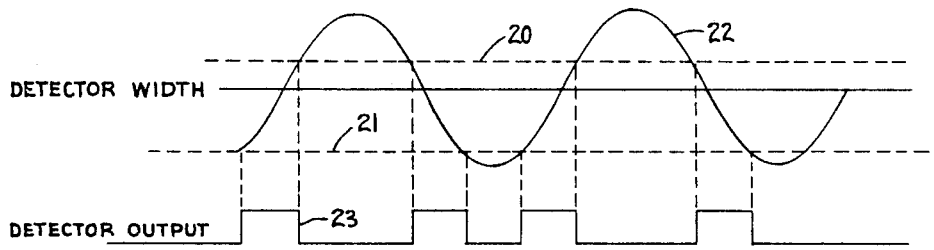
Fig. 4.
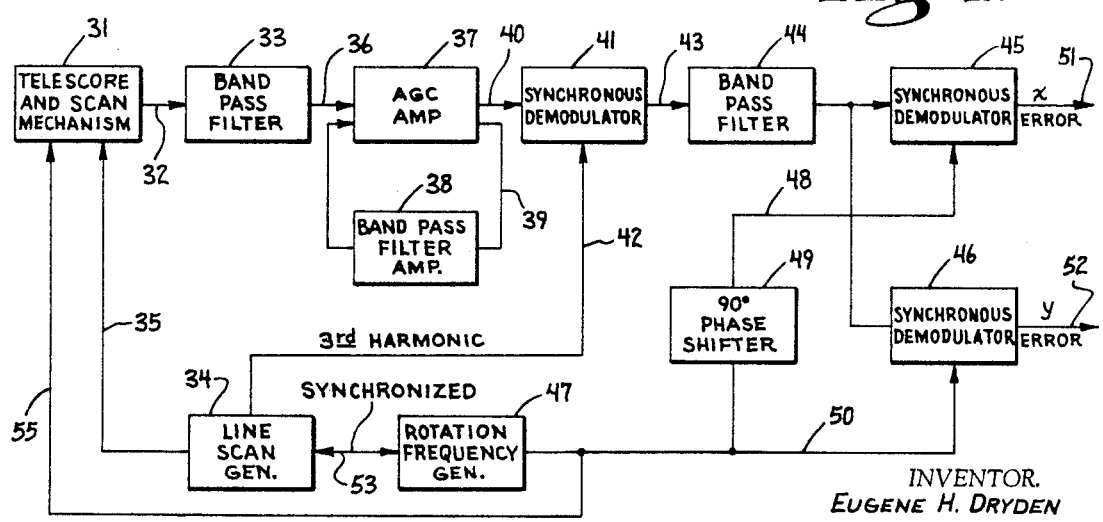
Fig. 5.
INVENTOR.
EUGENE H. DRYDEN
BY
H. H. Losche
Attorney

INFRARED TRACKER ERROR SIGNAL GENERATION AND PROCESSING SYSTEM

BACKGROUND OF THE INVENTION

Infrared scanning systems are known using rotating prisms, scanning discs, or rotating inclined mirrors to scan a target object over a detector face for developing tracking or guidance signals of a missile. In these known devices the noise signals interfere with the target signals which jeopardizes target tracking and/or control. Further, the known systems utilize a wide field of view which detracts from the sensitivity necessary for good tracking and/or control of the missile.

SUMMARY OF THE INVENTION

In this invention the telescope is of very small instantaneous field of view to provide the highest sensitivity possible of target objects. The scanning mechanism operates to cause scan in a rosette pattern to develop signals whenever the target point of scan crosses the detector face. The detector target signals are passed through an automatic gain control (AGC) circuit under the control of the first and third harmonics of the scan frequency signal to render the target signals independent of the target signal amplitude. The AGC signals are applied to a first synchronous demodulator together with the third harmonic of the signals generated for the scan mechanism of the telescope to produce a sinusoidal error signal at the line scan rotation rate, the amplitude of which is proportional to error amplitude and the relative phase of which is equal to error direction. This sinusoidal error signal is applied to two synchronous demodulators in parallel, to one of which is applied the scan rotation frequency and to the other of which is applied the scan rotation frequency 90° out of phase. The two synchronous demodulators, then, produce the $x$ and $y$ error signals for the servo driving system (not shown) to correct the telescope boresight for coincidence with the target It is accordingly a general object of this invention to provide an infrared tracker error signal generator circuit that normalizes the error signals of a telescope tracker and combines these signals with the scan rotation frequency of the telescope to produce error signals in the horizontal and vertical planes to be used in the tracking mechanism of the telescope to align the boresight thereof with the target.

BRIEF DESCRIPTION OF THE DRAWING

These and other objects and the attendant advantages, features, and uses of the invention will become more apparent to those skilled in the art as the description proceeds when taken with the accompanying drawing, in which:

FIG. 1 is a diagrammatic illustration of a telescope component of the tracking system;

FIGS. 2, 3, and 4, are voltage wave examples produced by the telescope scanning system of FIG. 1 for three values of tracking error; and FIG. 5 is a block circuit schematic diagram of the electronic circuit of this invention to generate the $x$ and $y$ error signals for correcting telescope boresight.

DESCRIPTION OF THE PREFERRED EMBODIMENT

Referring more particularly to FIG. 1 with occasional reference to FIGS. 2, 3, and 4, there is shown in schematic form a part of a telescope in which a primary mirror 10 in the telescope reflects parallel infrared light rays of a target object from the parabolic surface 11 to a secondary mirror 12. The infrared rays reflected from the secondary mirror 12 are brought to a focus on the face of a detector 13. The secondary mirror is controlled by a scanning mechanism 14 of any well known type to produce a sine wave scan, as shown by the sine waves in FIGS. 2, 3, and 4, as well as a rotating scan to produce a rosette scan pattern. The scanner mechanism 14 has a line scan frequency and a rotating scan frequency applied thereto, as will later be described, these two frequencies being synchronized integral multiples of each other. The scanner mechanism may be of any known type to produce a rosette scan or Lissajous pattern as may be possible in the U.S. Pat. Nos. of Zuckerbraun 3,258,599; Argyle 3,294,443; and Smith et al. 3,311,747, this scanner mechanism forming no part of the present invention. Infrared radiation from a target object reflects from the primary mirror surface 11 to the secondary mirror 12 where the scanner mechanism controls mirror 12 to scan the point or target object over the face of the detector 13 in a rosette pattern. The detector 13 will produce a signal each time the point or target object crosses the detector, as will be described with reference to FIGS. 2, 3, and 4.

FIG. 2 illustrates the width of the detector face by broken lines 20 and 21 with the point or target object being scanned in a sine wave 22 over the detector face. For the purpose of explanation the sine wave scan is on a single axis only but in the actual scanning operation the lower frequency rotating scan causes the scan to be a rosette, as hereinbefore stated. Whenever the scan crosses the detector face the detector produces a square wave 23. In FIG. 2 the axis of the sine wave 22 lies on the centerline of the detector face, represented by the lines 20 and 21, indicating that the target is on boresight of the telescope shown in FIG. 1.

FIGS. 3 and 4 show the conditions existing, and the resultant detector output pulse trains, for the center of the scan pattern below and above the center of the detector, respectively. These positions correspond, due to the inverting characteristic of the telescope, to the target above and below the telescope optical axis, respectively.

Referring to FIG. 5, where a block circuit schematic diagram of the error generating system is shown, a telescope and scan mechanism is represented by the block 31 to develop on its output 32 the detector output pulse train 23. The output 32 is coupled through a band-pass filter 33 to filter out all frequencies above the third harmonic of a line scan frequency generated by a line scan frequency generator 34 having its frequency applied to the scanner mechanism 14 over conductor means 35. The output of band-pass filter 33 is connected by way of conductor means 36 to an AGC amplifier 37 which has a band-pass filter and amplifier 38 in a feedback circuit 39 from the output 40 of the AGC amplifier to the input thereof. This band-pass filter passes only the fundamental line scan frequency and the second harmonic, and the amplifier operates to suppress high amplitude signals on output 40 and to amplify low amplitude signals to normalize all AGC output signals. The output 40 is coupled as one input to a first synchronous demodulator to which a second input is applied from the line scan generator 34 over the conductor means 42. The output of the line scan generator 34 over conductor 42 is the third harmonic of the line scan frequency which frequency is multiplied by the signals of output 40 to produce sinusoidal signals at the line scan rotation rate on an output 43 of demodulator 41, the amplitude of which is proportional to the error amplitude and the relative phase of which is equal to error direction. The third harmonic frequency is obtained on the output of 34 by proper tuned circuits, as well recognized by those skilled in the art. The signals on output 43 are filtered by a band-pass filter 44 to pass only the low frequency line scan rotation rate frequencies in common to second and third synchronous demodulators 45 and 46, respectively. The second input to each synchronous demodulator is from a rotation frequency generator 47, the second synchronous demodulator 45 getting this input over conductor means 48 through a 90° phase shifter 49 and the third synchronous demodulator 46 getting this input over the conductor means 50. The rotation frequency over conductor 55 is used to provide rotation scan in 31. Assuming that the rotation frequency of 47 is in synchronism in the proper phase relation with the line scan frequency, the multiplication of the 90° phase shifted rotation frequency with the signals from the synchronous demodulator 41 produces the direct current error signal for the $x$ coordinate of the target on output conductor 51 while a direct current error signal of the $y$ coordinate of the target is developed on the output 52. While the phase shifter 49 is shown and described as being in conductor means 48, it is to be understood that it may be in the conductor 50 if the phase relation of the rotation frequency generator is reversed 180°. The direct current outputs 51 and 52 are used for application to the x and y coordinate controls of the servosystem to correct the boresight direction of the telescope to bring it in alignment with the target thereby tracking the target.

The synchronous demodulators or detectors may be of any well known type such as shown and discussed in the Television Engineering Handbook by Donald G. Fink, First Edition, 1957, Sections 9.302 and 16.1402. The synchronous demodulator is sometimes referred to as a product demodulator and produces on its output a current that is proportional to the product of the two input signals at an amplitude proportional to the input signals.

The line scan generated frequency and the rotation generated frequency are multiples of each other to produce the rosette scan pattern, the rotation frequency being the lower of the two frequencies. For the purpose of example only, the scan frequency may be 350 cycles per second and the rotation frequency 35 cycles per second to develop a good rosette pattern. The two frequencies are synchronized as by a synchronizing coupling illustrated in FIG. 5 by the conductor means 53.

OPERATION

In the operation of the system in FIG. 5 let it be assumed that the telescope, shown in FIG. 1, is operating in the telescope and scan mechanism 31 and picks up a target that is emitting infrared signals. The scanning mechanism is controlled to scan a rosette pattern across the face of the detector 13 (FIG. 1) as a result of the line scan and rotation scan frequencies applied thereto from 34 and 47, respectively. As the scan is performed the detector 13 will produce an output of square waves 23 with a phase relation in accordance with the "on"target, or plus or minus error signals, as shown in FIGS. 2, 3, and 4. These output signals on conductor 32 are filtered of all frequencies but the fundamental through the third harmonic of the line scan frequency in the band-pass filter 33. These signals are amplified in the AGC circuit 37, the output of the amplifier being returned in a feedback circuit 39 through a band-pass filter 38 to pass the fundamental and second harmonic signals to control signal amplitude by reducing high amplitude signals and increasing low amplitude signals thus normalizing the signals to render the error signals independent of target amplitude. The error signals are represented by the phase difference in FIGS. 3 and 4. The first and second harmonic signals are applied to the filter 38 while the third harmonic of the signals is applied to the synchronous demodulator together with the third harmonic of the line scan frequency 34 by way of conductor 42. The product of the third harmonic of the error signals and the third harmonic of the line scan frequency produces a sine wave error signal at the rotation frequency on output 43. This frequency signal is passed through the band-pass filter 44 to remove the ripple produced by the fundamental and second harmonic signals to purify the sine wave error signal. The product of the sine wave error signal and the rotation frequency signal, shifted 90°, will produce on the output 51 of the second synchronous demodulator 45 a direct current signal proportional to the error signal in the x direction. The product of the sine wave error signal and the rotation frequency signal will produce on the output 52 of the third synchronous detector 46 a direct current signal proportional to the error signal in the y direction. The x and y direct current signals can be used to control the servosystem of the telescope to correct the telescope boresight axis for alignment with the target thus producing the no-error condition as shown in FIG. 2.

While many modifications and changes may be made in the constructional details and features of this invention without departing from the spirit thereof, I desire to be limited in the scope of my invention only by the limits of the following claims:.

I claim:

1. An infrared error signal generator and processing system having a telescope and scanning means to scan a target across a detector in the telescope in a rosette pattern to produce detected output error signals comprising:
    a first band-pass filter coupled to receive said detector output error signals to pass fundamental, second, and third harmonics thereof on an output;
    an automatic gain control means coupled to said first filter output to produce normalized error signals on an output;
    line frequency generator and rotation frequency generator means for the scanning means of the telescope;
    first means coupled to receive said error signals from said automatic gain control means and third harmonic signals from said line generator to produce a product of said signals on an output thereof; and
    second and third means coupled to receive the product output of said first means in common, one of said second and third means coupled to receive the frequency from said rotation generator shifted 90° and the other of said second and third means coupled to receive the frequency from said rotation generator directly, each second and third means producing product outputs, said second means product output being a direct current voltage representative of the x component of error of the target producing the error signal and said third means product output being a direct current voltage representative of the y component of error of the target.

2. An infrared error signal generator and processing system as set forth in claim 1 wherein said first, second, and third means are synchronous demodulators.

3. An infrared error signal generator and processing system as set forth in claim 2 wherein said automatic gain control means is an automatic gain controlled amplifier with a feedback circuit from its output to its input having a band-pass filter in said feedback constructed and arranged to pass the fundamental and second harmonic signals of said line generator.

4. An infrared error signal generator and processing system as set forth in claim 3 wherein said line frequency generator generate frequencies that are integral multiples of each other, said rotation frequency being of lower frequency than said line frequency.

5. An infrared error signal generator and processing system as set forth in claim 4 wherein said coupling of said second and third synchronous demodulators in common to said first synchronous demodulator is through a band-pass filter to filter out ripple caused by the fundamental and second harmonic signals of said error signals.

6. An infrared error signal generator and processing system as set forth in claim 5 wherein said second synchronous demodulator coupled to receive the frequency from said rotation generator shifted 90° is a coupling through a 90° phase shifter.

PO-1050
(5/69)

UNITED STATES PATENT OFFICE
CERTIFICATE OF CORRECTION

Patent No. 3,569,719          Dated March 9, 1971

Inventor(s) EUGENE H. DRYDEN

It is certified that error appears in the above-identified patent and that said Letters Patent are hereby corrected as shown below:

Column 4, Claim 4, lines 49 and 50 change:

"generator generate frequencies"

To read:

generator and said rotation frequency generator generate frequencies

Signed and sealed this 17th day of August 1971.

(SEAL)
Attest:

EDWARD M. FLETCHER, JR.          WILLIAM E. SCHUYLER, JR
Attesting Officer          Commissioner of Patents